US012636662B2

(12) United States Patent
Wang et al.

(10) Patent No.: US 12,636,662 B2
(45) Date of Patent: May 26, 2026

(54) WATER OUTLET DEVICE

(71) Applicant: Xiamen Lota International Co., Ltd., Xiamen (CN)

(72) Inventors: Xuedong Wang, Xiamen (CN); Jiangcheng Zhang, Xiamen (CN); Peiguo Wu, Xiamen (CN); Chuanbao Zhu, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 191 days.

(21) Appl. No.: 18/604,145

(22) Filed: Mar. 13, 2024

(65) Prior Publication Data

US 2025/0144648 A1 May 8, 2025

(30) Foreign Application Priority Data

Nov. 3, 2023 (CN) ......................... 202322970575.3

(51) Int. Cl.
*B05B 1/18* (2006.01)
*B05B 15/50* (2018.01)
*E03C 1/04* (2006.01)

(52) U.S. Cl.
CPC .............. *B05B 1/185* (2013.01); *B05B 15/50* (2018.02); *E03C 1/0408* (2013.01)

(58) Field of Classification Search
CPC ......... B05B 1/18; B05B 1/185; B05B 1/1882; B05B 1/1894; B05B 1/1896; B05B 15/50; E03C 1/0408
USPC .......................................................... 239/600
See application file for complete search history.

(56) References Cited

U.S. PATENT DOCUMENTS 5,730,361 A * 3/1998 Thonnes ............... B05B 15/528 239/602
9,821,326 B2 * 11/2017 Komaki .................. B05B 1/185
2005/0284967 A1 * 12/2005 Korb ....................... B05B 1/185 239/600

FOREIGN PATENT DOCUMENTS

GB 2210566 A * 6/1989 ............. B05B 1/185

* cited by examiner

*Primary Examiner* — Kyle Robert Thomas
(74) *Attorney, Agent, or Firm* — COOPER LEGAL GROUP LLC

(57) ABSTRACT

A water outlet device comprises a water outlet body and a cover assembly. The water outlet body comprises a plurality of water outlet ports, and the plurality of water outlet ports are configured to discharge water. The cover assembly is detachably connected to the water outlet body to cover the plurality of water outlet ports, and the cover assembly comprises a water outlet cover and a fixed cover. The water outlet cover comprises a plurality of water outlet columns that are elastically deformable, and the plurality of water outlet columns are respectively connected to and in communication with the plurality of water outlet ports. The fixed cover is detachably connected to the water outlet body, and the water outlet cover is fixedly clamped between the fixed cover and the water outlet body.

10 Claims, 4 Drawing Sheets

WATER OUTLET DEVICE

RELATED APPLICATIONS

This application claims priority to Chinese patent application number 202322970575.3, filed on Nov. 3, 2023. Chinese patent application number 202322970575.3 is incorporated herein by reference.

FIELD OF THE DISCLOSURE

The present disclosure relates to the field of sanitary ware, and in particular to a water outlet device.

BACKGROUND OF THE DISCLOSURE

A shower structure currently on the market comprises a housing, a water distribution body, and a water outlet cover. The water distribution body is arranged in the housing, and the water outlet cover is connected to the water distribution body. The water distribution body comprises a water inlet channel, a switching mechanism, and a water outlet channel. The water inlet channel is connected to an external water source, and the water outlet channel is connected to the water outlet cover. The switching mechanism controls whether the water inlet channel is connected to or not connected to the water outlet channel. The water distribution body comprises water outlets, and the water outlet cover comprises internal water channels and water outlet holes. There are silicone water outlet columns corresponding to each of the water outlet holes in the water outlet cover. The silicone water outlet columns can elongate a length of the water outlet holes, and an inner diameter of each of the silicone water outlet columns is made smaller, which can discharge thinner water jets. After scale is formed in the silicone water outlet columns, a user can directly crush the scale with his hands to prevent clogging. However, the water outlet cover is generally a one-piece structure, and the silicone water outlet columns cannot be easily removed and cleaned.

BRIEF SUMMARY OF THE DISCLOSURE

The present disclosure provides a water outlet device that can remove and clean the water outlet cover to solve the deficiencies in the background.

In order to solve the technical problem, a first technical solution of the present disclosure is as follows.

A water outlet device comprises a water outlet body and a cover assembly. The water outlet body comprises a plurality of water outlet ports, and the plurality of water outlet ports are configured to discharge water. The cover assembly is detachably connected to the water outlet body to cover the plurality of water outlet ports, and the cover assembly comprises a water outlet cover and a fixed cover. The water outlet cover comprises a plurality of water outlet columns that are elastically deformable, and the plurality of water outlet columns are respectively connected to and in communication with the plurality of water outlet ports. The fixed cover is detachably connected to the water outlet body, and the water outlet cover is fixedly clamped between the fixed cover and the water outlet body.

In a preferred embodiment, the cover assembly further comprises a pressing plate, the water outlet cover comprises a connecting pad connected to each of the plurality of water outlet columns, and the pressing plate is clamped between the connecting pad and the fixed cover.

In a preferred embodiment, the fixed cover comprises a plurality of holes, and the plurality of water outlet columns pass through and extend out of the plurality of holes.

In a preferred embodiment, the water outlet device further comprises a pushing spring, and the pushing spring is connected to the pressing plate and the water outlet body. When the pressing plate is clamped between the connecting pad and the fixed cover, the pushing spring accumulates an elastic force, and when the fixed cover is detached, the elastic force of the pushing spring pushes out the pressing plate.

In a preferred embodiment, the water outlet device further comprises a pressing member and one or more first locking members. The fixed cover comprises a second locking member, and the one or more first locking members are slidably disposed on the water outlet body. The pressing member is operatively coupled to the one or more first locking members to drive the one or more first locking members to be changed between an initial position and an unlocked position. When the one or more first locking members are at the initial position, the one or more first locking members are connected to the second locking member, and when the one or more first locking members are at the unlocked position, the one or more first locking members are disconnected from the second locking member.

In a preferred embodiment, the initial position and the unlocked position are disposed at intervals along a radial direction of the water outlet body, the initial position is located radially outside the unlocked position, and the second locking member is located on an inner wall of the fixed cover.

In a preferred embodiment, the water outlet device further comprises an elastic member. The elastic member is connected to the water outlet body and the one or more first locking members, and the elastic member is configured to drive the one or more first locking members to move radially outward to be at the initial position. The pressing member is configured to be pressed to drive the one or more first locking members to move radially inward to be at the unlocked position to enable the elastic member to accumulate a first elastic force.

In a preferred embodiment, the pressing member comprises a first sliding and guiding slope, and the one or more first locking members comprise a second sliding and guiding slope. The first sliding and guiding slope is in contact with the second sliding and guiding slope, and a moving direction of the pressing member is perpendicular to moving directions of the one or more first locking members. The pressing member is configured to be pressed to drive the one or more first locking members to move radially inward.

In a preferred embodiment, the one or more first locking members are a plurality of first locking members arranged at intervals along a circumferential direction of the water outlet body, and the pressing member is configured to synchronously drive the plurality of first locking members to move.

In a preferred embodiment, the water outlet device further comprises a button spring, and the button spring is connected to the pressing member and the water outlet body to drive the pressing member to reset.

Compared with the existing techniques, the technical solution has the following advantages.

The cover assembly is detachably connected to the water outlet body to cover the plurality of water outlet ports. The cover assembly comprises a water outlet cover and a fixed cover, and the water outlet cover comprises a plurality of water outlet columns which are elastically deformable. The plurality of water outlet columns are respectively connected to and in communication with the plurality of water outlet ports, the fixed cover is detachably connected to the water outlet body, and the water outlet cover is fixedly clamped between the fixed cover and the water outlet body. Users can easily separate the cover assembly from the water outlet body and clean the water outlet cover.

DETAILED DESCRIPTION OF THE EMBODIMENTS

The present disclosure will be further described below in combination with the accompanying drawings and embodiments.

Figure 1:
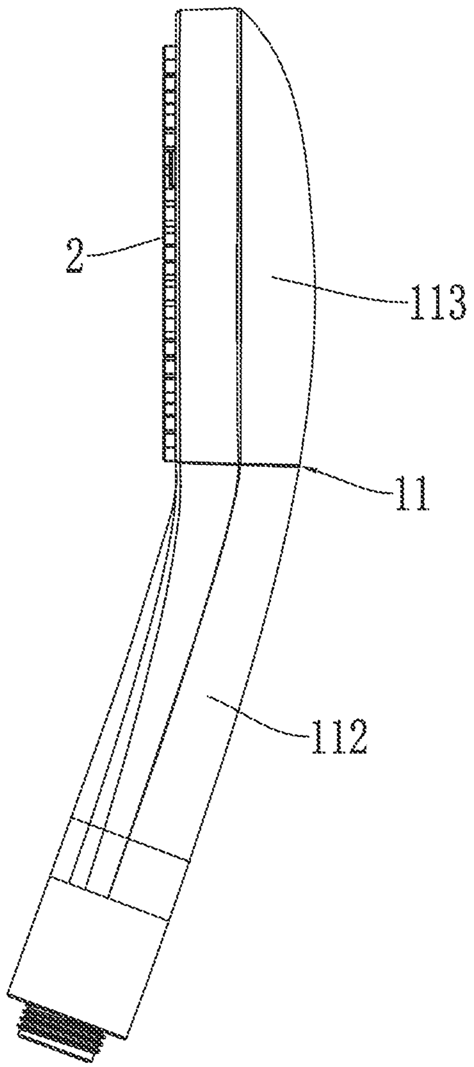
FIG. 1 illustrates a side view of a water outlet device in a preferred embodiment in the present disclosure.
Figure 2:
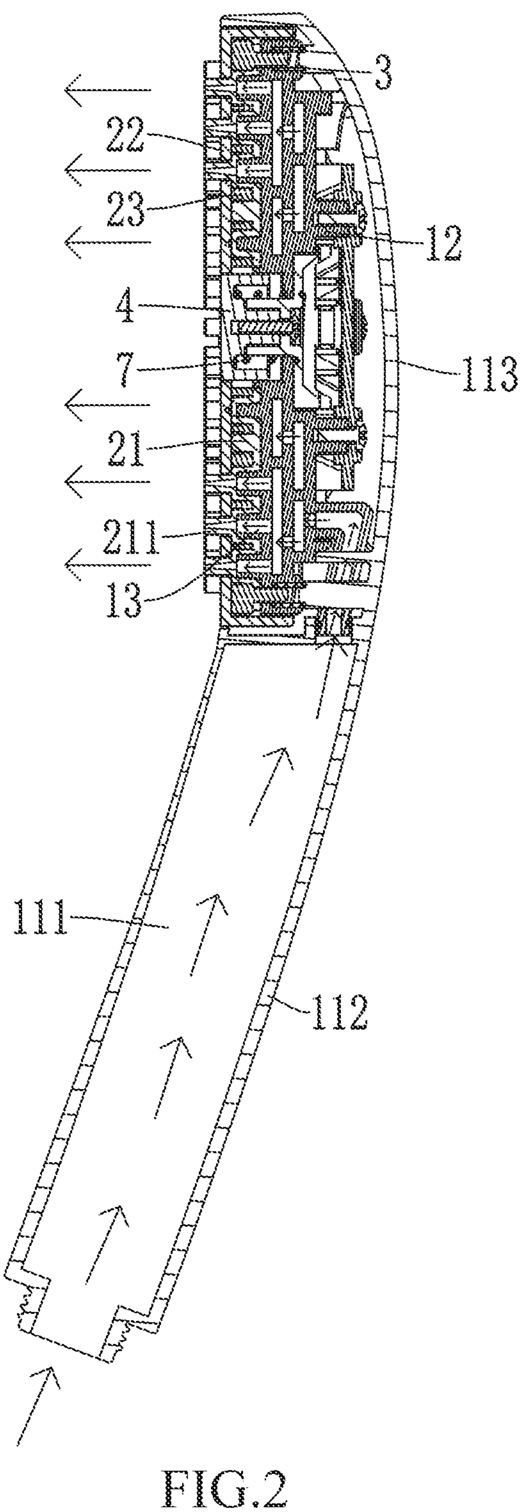
FIG. 2 illustrates a cross-sectional view of the water outlet device in the preferred embodiment in the present disclosure.
Figure 3:
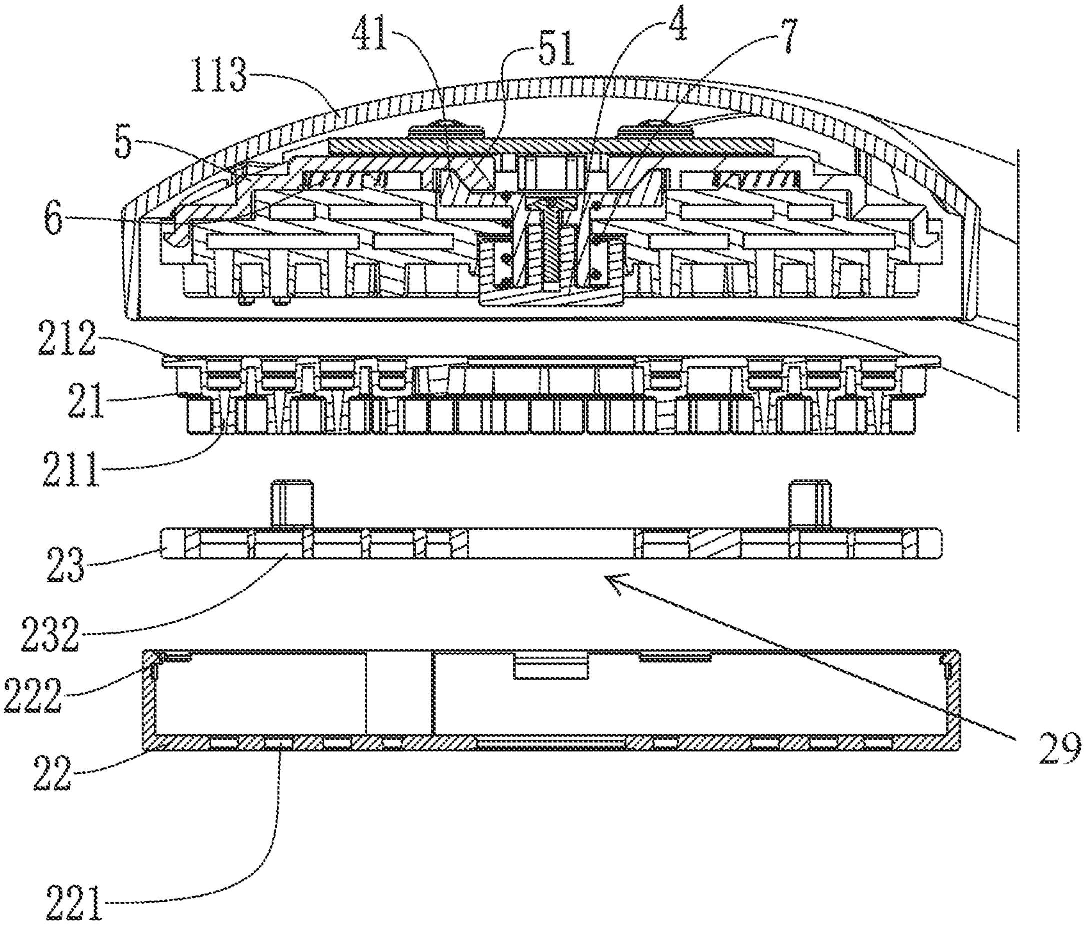
FIG. 3 illustrates a cross-sectional and exploded view of the water outlet device in the preferred embodiment in the present disclosure.
Figure 4:
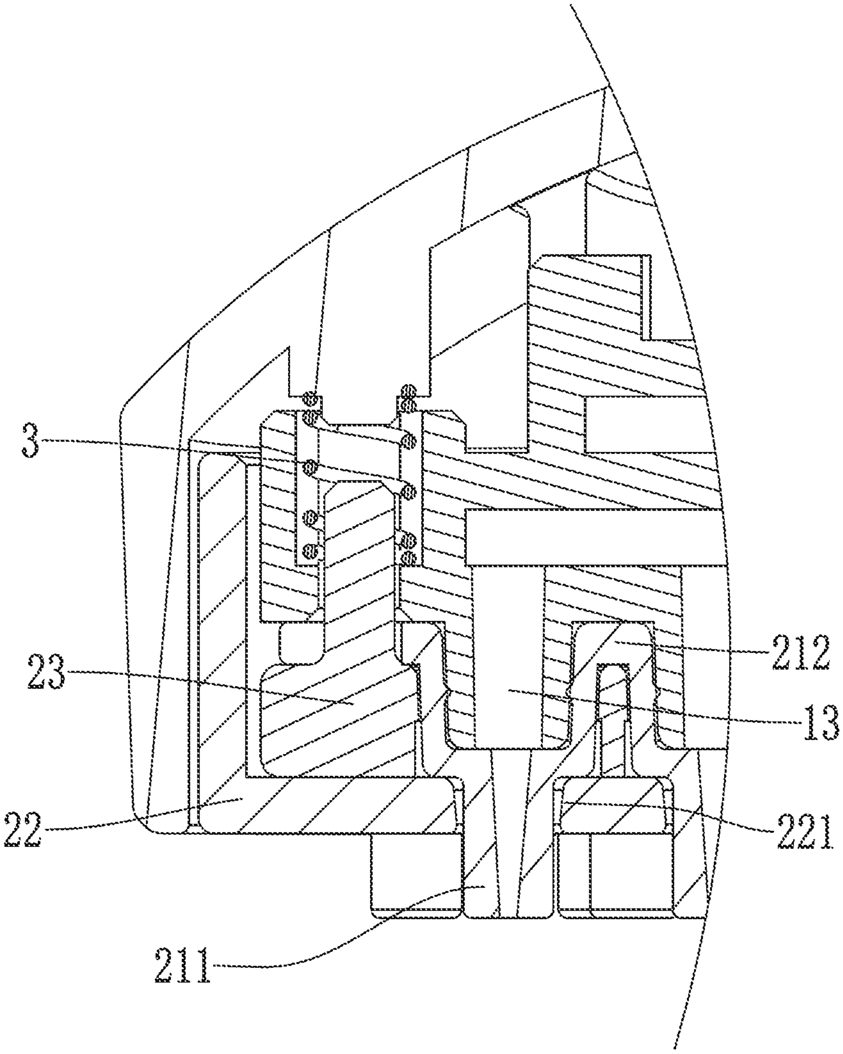
FIG. 4 illustrates a partial cross-sectional view of the water outlet device in the preferred embodiment in the present disclosure.

Referring to FIGS. 1-4, a water outlet device comprises a water outlet body and a cover assembly 2. The water outlet body comprises a housing 11 and a water outlet seat 12. The housing 11 comprises a handheld housing 112 and a water outlet housing 113. One end of the handheld housing 112 is connected to the water outlet housing 113. A water inlet channel 111 is formed in the handheld housing 112, and the water outlet seat 12 is disposed in the water outlet housing 113. The water outlet seat 12 comprises a plurality of water outlet ports 13. The water inlet channel 111 is connected to the water outlet seat 12 through a switching valve. Water enters the water outlet seat 12 from the water inlet channel 111 and flows out from the plurality of water outlet ports 13.

The cover assembly 2 is detachably connected to the water outlet body to cover the plurality of water outlet ports 13. The cover assembly 2 comprises a water outlet cover 21 and a fixed cover 22. The water outlet cover 21 comprises a plurality of water outlet columns 211 that are elastically deformable, and the plurality of water outlet columns 211 are respectively connected to and in communication with the plurality of water outlet ports 13. The fixed cover 22 is detachably connected to the water outlet body, and the water outlet cover 21 is fixedly clamped between the fixed cover 22 and the water outlet body. The cover assembly 2 can be easily detached from the water outlet body, and a user can easily clean the water outlet cover 21. Each of the plurality of water outlet columns 211 can be independent, or the plurality of water outlet columns 211 can be connected together by a connecting pad 212 to enable the water outlet cover 21 to be formed as an integral structure.

The cover assembly 2 further comprises a pressing plate 23. The water outlet cover 21 comprises the connecting pad 212 connected to each of the plurality of water outlet columns 211. The pressing plate 23 is clamped between the connecting pad 212 and the fixed cover 22. In this embodiment, the pressing plate 23 comprises a plate body and a plurality of through holes 232 formed on the plate body. The plurality of through holes 232 are configured to respectively correspond to the plurality of water outlet columns 211. The plate body corresponds to the connecting pad 212, and the fixed cover 22 can fixedly press the pressing plate 23 on the connecting pad 212 to enable the water outlet cover 21 to be more firmly fixed.

The water outlet device also comprises a pushing spring 3, which is connected to the pressing plate 23 and the water outlet body. When the pressing plate 23 is clamped between the connecting pad 212 and the fixed cover 22, the pushing spring 3 accumulates an elastic force. When the fixed cover 22 is detached, the elastic force of the pushing spring 3 pushes out the pressing plate 23.

In this embodiment, the fixed cover 22 comprises a plurality of holes 221. The plurality of water outlet columns 211 pass through and extend out of the plurality of holes 221. The plurality of water outlet columns 211 can be pinched to crush limescale in the water outlet columns 211.

The water outlet device further comprises a pressing member 4 and one or more first locking members 5. The fixed cover 22 comprises a second locking member 222. The one or more first locking members 5 are slidably disposed on the water outlet body. The pressing member 4 is operatively coupled to the one or more first locking members 5 to drive the one or more first locking members 5 to be changed between an initial position and an unlocked position. When the one or more first locking members 5 are at the initial position, the one or more first locking members 5 are connected to the second locking member 222. When the one or more first locking members 5 are at the unlocked position, the one or more first locking members 5 and the second locking member 222 are disconnected.

The initial position and the unlocked position are disposed at intervals along a radial direction of the water outlet body. The initial position is located radially outside the unlocked position, and the second locking member 222 is located on an inner wall of the fixed cover 22. In this embodiment, the second locking member 222 is an inner annular groove formed on the inner wall of the fixed cover 22.

The water outlet device also comprises an elastic member 6. The elastic member 6 is connected to the water outlet body and the one or more first locking members 5. The elastic member 6 drives the one or more first locking members 5 to move radially outward to be at the initial position. The pressing member 4 is pressed to be configured to drive the one or more first locking members 5 to move radially inward to be at the unlocked position, and the elastic member 6 accumulates a first elastic force. In this embodiment, the elastic member 6 is a spring. The pressing member 4 comprises a first sliding and guiding slope 41, and the one or more first locking members 5 comprise a second sliding and guiding slope 51. The first sliding and guiding slope 41 and the second sliding and guiding slope 51 are in contact with each other. A moving direction of the pressing member 4 is perpendicular to moving directions of the one or more first locking members 5, and the pressing member 4 is pressed to drive the one or more first locking members 5 to move radially inward.

In this embodiment, the one or more first locking members 5 are a plurality of first locking members 5 arranged at intervals along a circumferential direction of the water outlet body, and the pressing member 4 synchronously drives the plurality of first locking members 5 to move. More specifically, the plurality of first locking members 5 are four first locking members 5, and the four first locking members 5 are evenly spaced along the circumferential direction of the water outlet body.

In this embodiment, the cover assembly 2 comprises a middle hole 29, and the pressing member 4 slides in the middle hole 29.

In this embodiment, the water outlet device further comprises a button spring 7, which is connected to the pressing member 4 and the water outlet body to drive the pressing member 4 to reset.

During a disassembly process, the user can press the pressing member 4, and the first sliding and guiding slope 41 of the pressing member 4 interacts with the second sliding and guiding slope 51 of the one or more first locking members 5 to drive the one or more first locking members 5 to move radially inward and away from the second locking member 222. At this time, the user can easily take out the water outlet cover 21 for cleaning.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A water outlet device, comprising:

a water outlet body, and a cover assembly, wherein:

the water outlet body comprises a plurality of water outlet ports, the plurality of water outlet ports are configured to discharge water, the cover assembly is detachably connected to the water outlet body to cover the plurality of water outlet ports, the cover assembly comprises a water outlet cover and a fixed cover, the water outlet cover comprises a plurality of water outlet columns that are elastically deformable, the plurality of water outlet columns are downstream of the plurality of water outlet ports and align one-to-one with the plurality of water outlet ports to be respectively in communication with the plurality of water outlet ports, the fixed cover is detachably connected to the water outlet body, and the water outlet cover is fixedly clamped between the fixed cover and the water outlet body, wherein: upper ends of the plurality of water outlet columns are respectively sleeved on outer sides of the plurality of water outlet ports to align one-to-one with the plurality of water outlet ports to be respectively in communication with the plurality of water outlet ports.

2. The water outlet device according to claim 1, wherein:

the cover assembly further comprises a pressing plate, the water outlet cover comprises a connecting pad connected to each of the plurality of water outlet columns, and the pressing plate is clamped between the connecting pad and the fixed cover.

3. The water outlet device according to claim 2, wherein:

the water outlet device further comprises a pushing spring, the pushing spring is connected to the pressing plate and the water outlet body, when the pressing plate is clamped between the connecting pad and the fixed cover, the pushing spring accumulates an elastic force, and when the fixed cover is detached, the elastic force of the pushing spring pushes out the pressing plate.

4. The water outlet device according to claim 1, wherein:

the fixed cover comprises a plurality of holes, and the plurality of water outlet columns pass through and extend out of the plurality of holes.

5. The water outlet device according to claim 1, wherein:

the water outlet device further comprises a pressing member and one or more first locking members, the fixed cover comprises a second locking member, the one or more first locking members are slidably disposed on the water outlet body, the pressing member is operatively coupled to the one or more first locking members to drive the one or more first locking members to be changed between an initial position and an unlocked position, when the one or more first locking members are at the initial position, the one or more first locking members are connected to the second locking member, and when the one or more first locking members are at the unlocked position, the one or more first locking members are disconnected from the second locking member.

6. The water outlet device according to claim 5, wherein:

the initial position and the unlocked position are disposed at intervals along a radial direction of the water outlet body, the initial position is located radially outside the unlocked position, and the second locking member is located on an inner wall of the fixed cover.

7. The water outlet device according to claim 6, wherein:

the water outlet device further comprises an elastic member, the elastic member is connected to the water outlet body and the one or more first locking members, the elastic member is configured to drive the one or more first locking members to move radially outward to be at the initial position, and the pressing member is configured to be pressed to drive the one or more first locking members to move radially inward to be at the unlocked position to enable the elastic member to accumulate a first elastic force.

8. The water outlet device according to claim 7, wherein:

the pressing member comprises a first sliding and guiding slope, the one or more first locking members comprise a second sliding and guiding slope, the first sliding and guiding slope is in contact with the second sliding and guiding slope, a moving direction of the pressing member is perpendicular to moving directions of the one or more first locking members, and the pressing member is configured to be pressed to drive the one or more first locking members to move radially inward.

9. The water outlet device according to claim 8, wherein:

the one or more first locking members are a plurality of first locking members arranged at intervals along a circumferential direction of the water outlet body, and the pressing member is configured to synchronously drive the plurality of first locking members to move.

10. The water outlet device according to claim 5, wherein:

the water outlet device further comprises a button spring, and the button spring is connected to the pressing member and the water outlet body to drive the pressing member to reset.

* * * * *